United States Patent
Cattoor et al.

(10) Patent No.: US 10,801,559 B2
(45) Date of Patent: Oct. 13, 2020

(54) WET CLUTCH ACTUATION PISTON AND METHOD OF USE

(71) Applicant: DANA BELGIUM N.V., Bruges (BE)

(72) Inventors: Kurt Cattoor, Bruges (BE); Kathleen Derycker, Zuienkerke (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 227 days.

(21) Appl. No.: 15/572,576

(22) PCT Filed: May 6, 2016

(86) PCT No.: PCT/EP2016/060162
§ 371 (c)(1),
(2) Date: Nov. 8, 2017

(87) PCT Pub. No.: WO2016/180723
PCT Pub. Date: Nov. 17, 2016

(65) Prior Publication Data
US 2018/0149209 A1     May 31, 2018

Related U.S. Application Data

(60) Provisional application No. 62/158,623, filed on May 8, 2015.

(51) Int. Cl.
*F16D 13/52* (2006.01)
*F16D 25/12* (2006.01)
(Continued)

(52) U.S. Cl.
CPC .............. *F16D 25/12* (2013.01); *F16D 13/52* (2013.01); *F16D 25/0638* (2013.01); *F16D 2048/0212* (2013.01)

(58) Field of Classification Search
CPC ...... F16D 25/12; F16D 13/52; F16D 25/0638; F16D 2048/0212
See application file for complete search history.

(56) References Cited

U.S. PATENT DOCUMENTS 3,612,237 A * 10/1971 Honda ................ F16D 25/0638
192/85.29
4,371,066 A    2/1983 Fujioka et al.
(Continued)

FOREIGN PATENT DOCUMENTS

CN     102434600 A    5/2012
CN     204025432 U    12/2014
(Continued)

OTHER PUBLICATIONS

European Patent Office, International Search Report with Written Opinion issued in PCT/EP2016/060162, dated Aug. 19, 2016, 10 pages, European Patent Office, Rijswijk, Netherlands.
(Continued)

*Primary Examiner* — David J Hlavka
(74) *Attorney, Agent, or Firm* — McCoy Russell LLP

(57) ABSTRACT

A piston (50), comprising: •a shaft side (52) with a first circumferential groove, said first circumferential groove (90) bounded by a continuous circumferential seal plateau (88), said seal plateau extending axially outward from said first circumferential groove, wherein a planar outboard surface (96) extends radially outboard from said seal plateau; •a clutch side (54) having two grooves alternating with two lands (102, 108); •an inner circumferential surface (56) having a seal groove (62) formed therein; and an outer circumferential surface (58) with a having a seal groove (76) formed therein, wherein the sides and surfaces form a ring shape.

15 Claims, 4 Drawing Sheets

(51) Int. Cl.
*F16D 25/0638* (2006.01)
*F16D 48/02* (2006.01)

(56) References Cited

U.S. PATENT DOCUMENTS

| | | | | |
|---|---|---|---|---|
| 4,548,306 | A * | 10/1985 | Hartz | F16D 25/0638 188/72.3 |
| 4,724,745 | A * | 2/1988 | Sumiya | F16D 25/0638 192/48.614 |
| 5,551,548 | A * | 9/1996 | Shubinsky | F16D 25/0638 192/106 F |
| 5,791,447 | A * | 8/1998 | Lamela | F16D 25/0638 192/111.1 |
| 5,992,597 | A * | 11/1999 | Nagai | B21D 22/16 192/109 F |
| 6,138,807 | A * | 10/2000 | Saito | F16D 13/52 192/107 M |
| 6,305,521 | B1 * | 10/2001 | Hall, III | F15B 21/044 192/85.41 |
| 2002/0038748 | A1 * | 4/2002 | Gu | F16D 13/52 192/70.14 |
| 2006/0054444 | A1 * | 3/2006 | Bishop | F16D 25/0638 192/85.32 |
| 2009/0288927 | A1 * | 11/2009 | Dougan | F16D 25/0638 192/52.1 |
| 2012/0073931 | A1 | 3/2012 | Yun | |

FOREIGN PATENT DOCUMENTS

| | | |
|---|---|---|
| CN | 204025433 U | 12/2014 |
| DE | 4020241 A1 | 1/1991 |
| DE | 4038454 A1 | 6/1991 |
| EP | 1918602 A2 | 10/2007 |
| WO | 2006/041017 A1 | 4/2006 |

OTHER PUBLICATIONS

China National Intellectual Property Administration, Notice of First Office Action issued in Application No. 201680025800.6, dated Dec. 20, 2018, 17 pages.

* cited by examiner

WET CLUTCH ACTUATION PISTON AND METHOD OF USE

FIELD OF THE INVENTION

The field of the invention relates to clutch pistons. More particularly, the field relates to wet clutch actuation pistons in vehicle transmissions.

BACKGROUND OF THE INVENTION

FIG. 1-3 depict a prior art wet clutch actuation piston 10. The piston 10 is a generally ring shaped. The piston 10 has a shaft side 12, a clutch side 14, an inner circumferential surface 16 and an outer circumferential surface 18. The piston 10 is preferably one piece, integrally formed and unitary in its design.

The inner circumferential surface 16 has a substantially constant diameter, but a least one groove 20 may be formed therein. The groove 20 may accommodate a fluid seal, such as an O-ring (not shown). A shaft (not shown) is located within the inner circumferential surface 16 and the seal prevents fluid from escaping between the shaft and the piston 10.

The outer circumferential surface 18 is comprised of a first portion 22 and a second portion 24. The first and second portions 22, 24 are in direct contact with one another, and one transitions to the other.

The first portion 22 may have a substantially constant outer diameter. The second portion 24 has a ridge 26 with a diameter larger than a diameter for the first portion 22. The first portion 22 has a comparatively smaller diameter so the piston 10 can slide within a housing (not shown) without getting stopped by the housing or caught on the housing. The second portion 24 also fits within the housing.

The second portion 24 may have a least one groove 28 formed therewith. The groove 28 accommodates a fluid seal (not shown) designed to prevent fluid from escaping between the piston 10 and the housing.

An oil port 30 may be located in the piston 10. The oil port 30 extends continuously from the shaft side 12 to the clutch side 14. The port 30 permits fluid to flow between the two sides 12, 14. The oil port 30 may be located nearer the outer circumferential surface 18 than the inner circumferential surface 16, as shown in the figures.

The shaft side 12 has a first circumferential groove 32 about the inner circumferential surface 16. The first circumferential groove 32 has a constant outer diameter. The first circumferential groove 32 transitions to a second circumferential groove 34 located radially outward from the first circumferential groove 32. The second circumferential groove 34 has a constant diameter. The first circumferential groove 32 has a greater depth into the piston 10 than the second circumferential groove 34. The grooves 32, 34 are designed to permit fluid to freely communicate between them. Thus, it can be appreciated that fluid is located substantially along the entire radial dimension of the shaft side 12 of the piston 10.

The second circumferential groove 34 extends radially outward to a land portion 36. The land portion 36 has no depth in the piston 10 and it is planar. The land portion 36 radially extends to the outer circumferential surface 18.

The clutch side 14 of the piston 10 has a first circumferential groove 38 about the inner circumferential surface 16. The first groove 38 has a constant diameter. A first axially extending land 40 separates the first groove 38 from the piston inner circumferential surface 16. A second axially extending land 42 separates the first groove 38 from a second circumferential groove 44. The second circumferential groove 44 has a constant diameter. The second circumferential groove 44 radially extends to a third axially extending land portion 46. The third land portion 46 extends to the outer circumferential surface 18. The third land portion 46 may have milled out portions 48 to permit the inflow and outflow of oil.

The design depicted in FIGS. 1-3 has a number of disadvantages associated with it. One of the most significant disadvantages is that when oil is located on the shaft side 12 of the piston 10, along the first and second circumferential grooves 32, 34, and the piston 10 is rotating, particularly at high speed, fluid in the grooves 32, 34 will cause the piston 10 to move toward a clutch (not shown) because of the centrifugal forces acting on the fluid and thus the piston 10. Piston 10 movement can result in the clutch unintentionally becoming engaged, even just partially. Even partial clutch engagement can result in premature clutch wear, heat and cause the system to work harder than necessary thus becoming less efficient.

It would be advantageous to have a piston that did not suffer from the same disadvantages of the prior art design. More particularly, it would be advantageous to have a piston design that reduces the amount of fluid on the shaft side of the piston so that centrifugal forces do not cause the fluid to drive the piston into unintentional engagement with the clutch.

SUMMARY OF THE INVENTION

In one embodiment, a piston comprises a shaft side with a first circumferential groove. The first circumferential groove is bounded by a continuous circumferential seal plateau. A planar outboard surface extends radially outboard from said seal plateau. The piston also comprises a clutch side, an inner circumferential surface, and an outer circumferential surface.

A shaft may extend through the inner circumferential surface of the piston, where the shaft may be in selective contact with the first circumferential groove. A clutch pack may be in in direct contact with the clutch side of the piston.

A method of operating a piston clutch system is also described. The method comprises selectively delivering pressurized fluid along a fluid conduit within the shaft to a location behind the first circumferential groove in the piston. The seal plateau is used to define a radial fluid boundary of the first circumferential groove. When the piston rotates, the seal plateau prevents centrifugal forces from moving the fluid radially outward beyond the seal plateau. The piston is axially translated into the clutch pack against a biasing member to selectively lock a plurality of interleaved plates in the clutch pack.

BRIEF DESCRIPTION OF THE DRAWINGS

The above will become readily apparent to those skilled in the art from the following detailed description when considered in the light of the accompanying drawings in which.

DETAILED DESCRIPTION OF THE PREFERRED EMBODIMENTS

Figure 1:
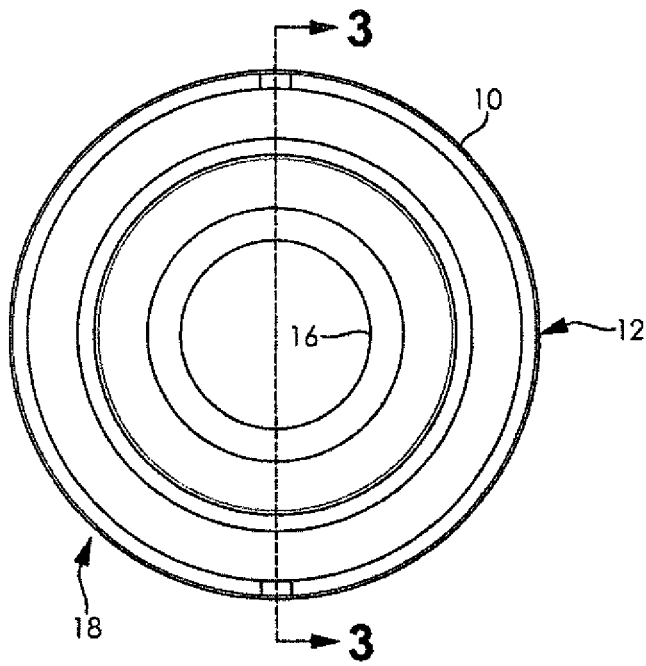
FIG. 1 is a view of one side of a prior art wet clutch actuation piston.
Figure 3:
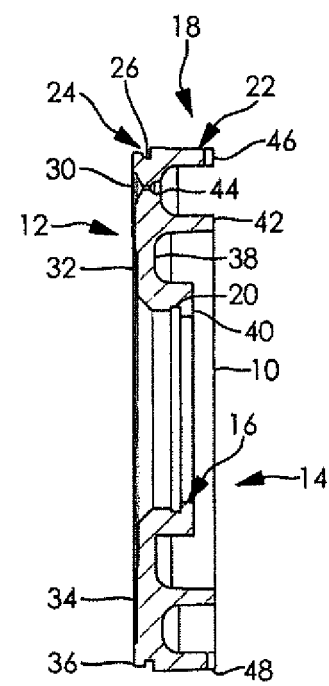
FIG. 3 is a cut-away side view along lines 3-3 of FIG. 1.
Figure 2:
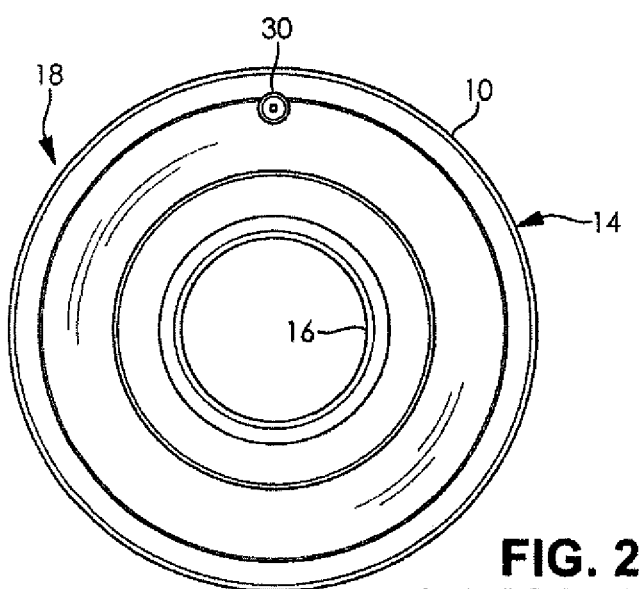
FIG. 2 is a view of the opposite side of a prior art wet clutch actuation piston from that shown in FIG. 1.
Figure 4:
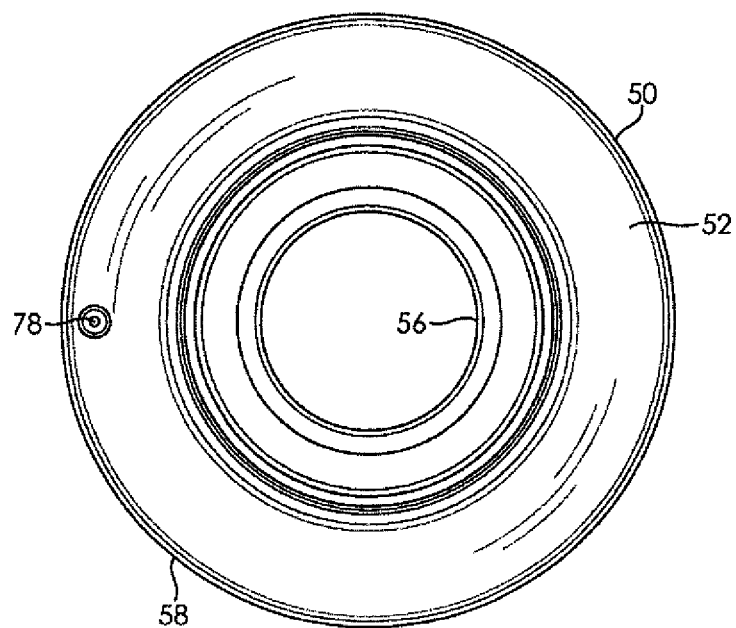
FIG. 4 is a view of one side of a preferred embodiment of a wet clutch actuation piston.
Figure 5:
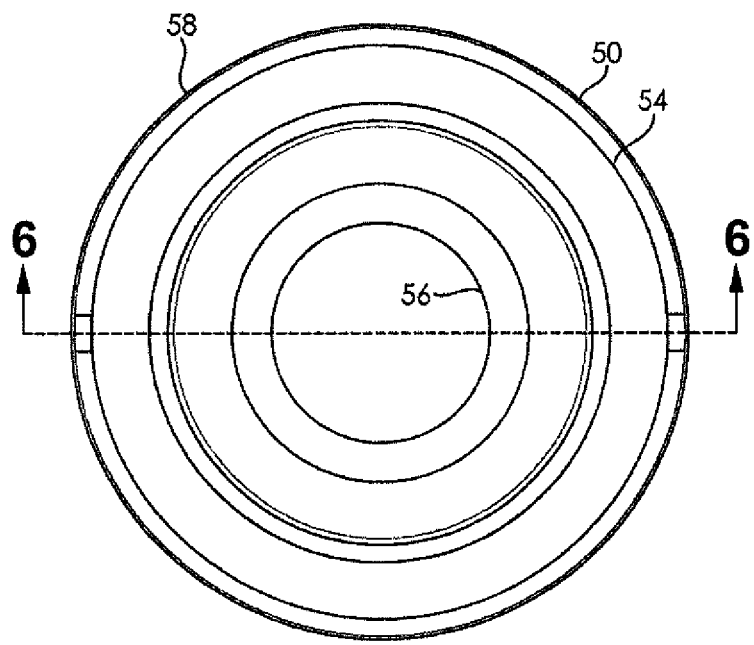
FIG. 5 is a view of another side of the wet clutch actuation piston from that shown in FIG. 4.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Turning now to FIGS. 4-7, one embodiment of the present invention is depicted. The present invention comprises a wet clutch actuation piston 50. The piston 50 is generally ring shaped. The piston 50 has a shaft side 52, a clutch side 54, an inner circumferential surface 56 and an outer circumferential surface 58. The piston 50 is preferably one piece, integrally formed and unitary in its design.

The inner circumferential surface 56 has a substantially constant diameter, but at least one groove 60 may be formed therein. The groove 60 may accommodate a fluid seal 62, such as an O-ring. A shaft 64 is located within the inner circumferential surface 56 and the seal 62 prevents fluid from escaping between the shaft 64 and the piston 50.

The outer circumferential surface 58 may be comprised of a first portion 66 and a second portion 68. The first and second portions 66, 68 are in direct contact with one another, and one transitions to the other.

The first portion 66 may have a substantially constant outer diameter. The second portion 68 has a ridge 70 with a diameter larger than a diameter for the first portion 66. The first portion 66 has a comparatively smaller diameter so the piston 10 can slide within a housing 72 without getting stopped by the housing 72 or caught on the housing 72. The second portion 68 also fits within the housing 72.

The second portion 68 may have a least one groove 74 formed therewith. The groove 74 accommodates a fluid seal 76 designed to prevent fluid from escaping between the piston 68 and the housing 72.

An oil port 78 may be located in the piston 50. The oil port 78 extends continuously from the shaft side 12 to the clutch side 14. The port 78 permits fluid to flow between the two sides 12, 14. The oil port 78 may be located nearer the outer circumferential surface 58 than the inner circumferential surface 56. The location of the port 78 will be defined further below.

The shaft side 52 has a first circumferential groove 80 about the inner circumferential surface 56. The first circumferential groove 80 transitions from the inner circumferential surface 56. The first circumferential groove 80 has a constant outer diameter and a constant axial depth into the piston 50.

Figure 6:
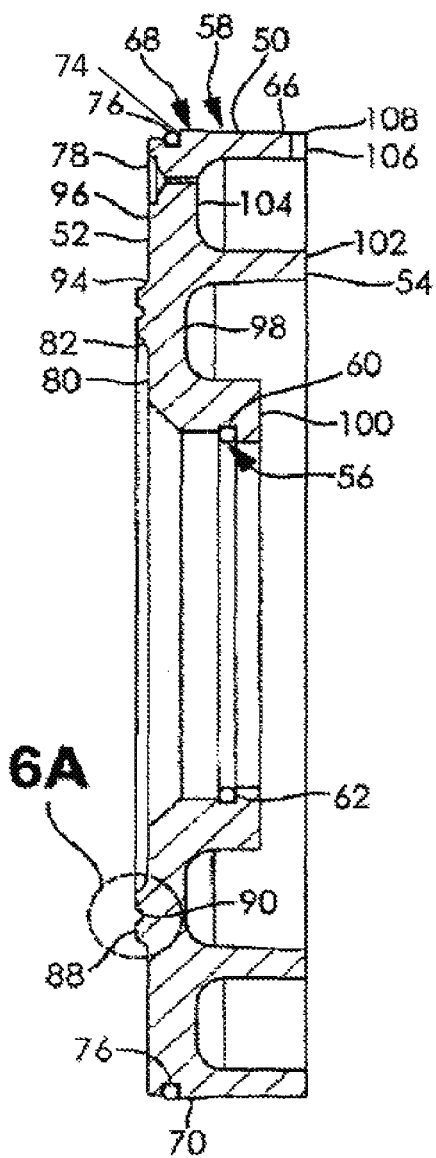
FIG. 6 is a view along lines 6-6 of FIG. 5.
Figure 6A:
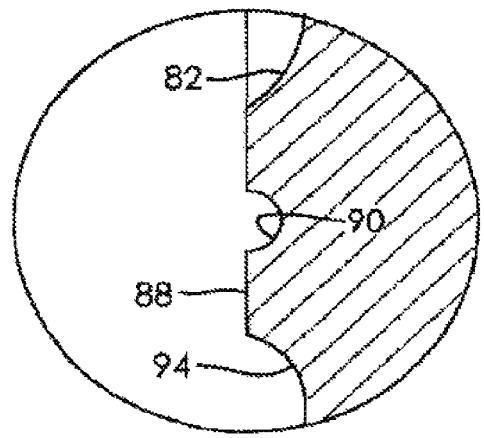
Figure 7:
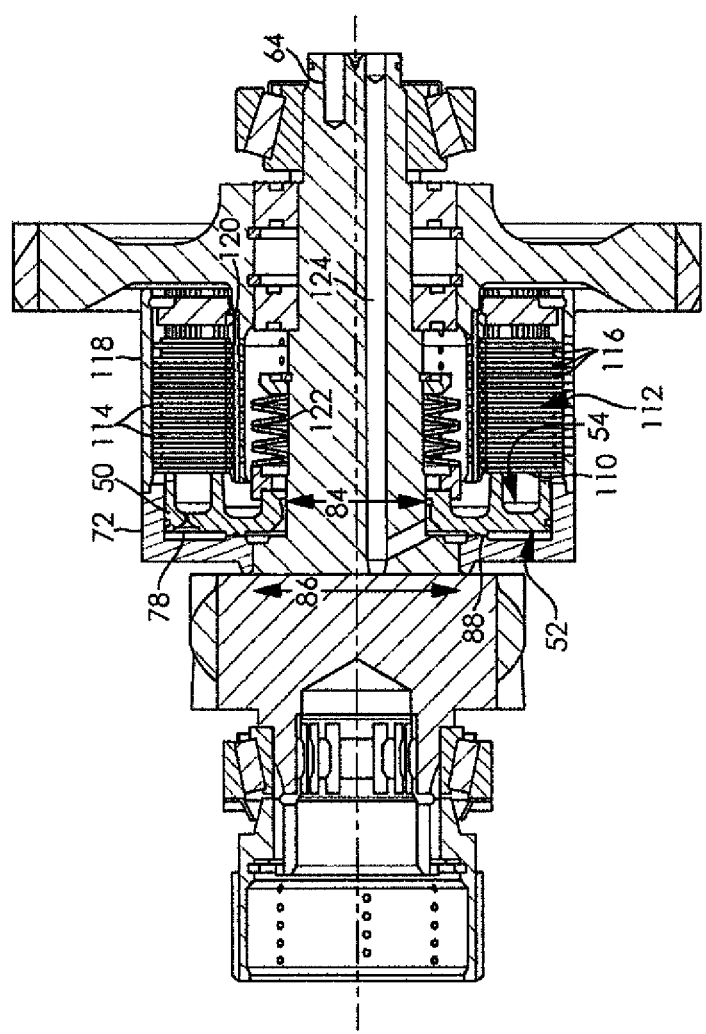
FIG. 7 is a partial cut away side view of the piston of FIGS. 4-6 installed in a portion of a transmission.

As seen in FIG. 6 the first circumferential groove 80 transitions to a seal plateau 88 with a radius 82. At an outer diameter of the seal plateau 88, the seal plateau 88 transitions into a second circumferential groove 96 with a radius 94. The seal plateau 88 is the only portion on the shaft side 52 of the piston 50 that comes into contact with the housing 72.

In the depicted embodiment, the shaft 64 is a multi-diameter shaft. The shaft 64 extends through the inner circumferential surface 56 at a first diameter 84. The inner circumferential surface 56 and/or its seal 62 contact the shaft 64 at the first diameter 84. The shaft 64 expands radially outward to a second, larger diameter 86. The second larger diameter 86 is located immediately axially adjacent to the first circumferential groove 80.

The first circumferential groove 80 and the second circumferential groove 96 transition in the axial direction away from the clutch side 54 to the seal plateau 88 using the radii 82, 94.

The seal plateau 88 has a radial length that extends in the axial direction more than any other feature on the shaft side 52. The seal plateau 88 extends circumferentially continuously about the shaft side 52 and it is planar, except as noted below.

A groove 90 is located within the seal plateau 88. The groove 90 may accommodate a fluid seal (not shown), such as an O-ring, for example. The seal plateau 88 prevents fluid from transferring radially inward or outward past the groove 90 along the shaft side 52. It is understood that the fluid seal is not required for the seal plateau 88 to prevent a transfer of fluid past the groove 90. The groove 90 is located in the middle of the seal plateau 88 in the depicted embodiment.

A transition 94 is located between the seal plateau 58 and an outboard surface 96 of the piston 50. In the depicted embodiment, the transition 94 is a radius transition. The transition 94 locates the outboard surface 96 axially inward from the seal plateau 88. As shown in FIG. 6, the transition 94 locates the outboard surface 96 axially inward from the first circumferential groove 80.

The outboard surface 96 extends from the transition 94 in the radially outward direction to the outer circumferential surface 58. The outboard surface 96 is planar with the exception of the above-mentioned oil port 78.

The clutch side 54 of the piston 50 has a first circumferential groove 98 about the inner circumferential surface 56. The first groove 98 has a constant diameter. A first axially extending land 100 separates the first groove 98 from the inner circumferential surface 16. A second axially extending land 102 separates the first groove 98 from a second groove 104. The second circumferential groove 104 has a constant diameter. The second circumferential groove 104 radially extends to a third axially extending land portion 106. The third land portion 106 extends to the outer circumferential surface 18. The third land portion 106 may have milled out portions 108 to permit the inflow and outflow of fluid.

The second and third lands 102, 106 are in direct contact with a first clutch plate 110 of a clutch pack 112. The clutch pack 112 is comprised of a plurality of interleaved plates. The plates comprise a first plurality 114 and a second plurality 116. The first plurality 114 is mounted for axial movement within an outer housing 118. The second plurality 116 is mounted for axial movement along a gear 120.

The plates 114, 116 in the clutch pack 112 are biased in a first direction by a spring 122. The spring 122 is located radially inward from the clutch pack 112 but in contact with the gear 120. More particularly, the spring 122 biases the clutch pack 112 such that the plates 114, 116 do not lock together. When the plates 114, 116 are not locked together, the gear 120 and the housing 118 are free to rotate with respect to one another.

When it is desired that the clutch housing 118 and the gear 120 rotate together, a fluid, such as oil, is delivered under pressure through a supply channel 124 located within the shaft 64. The supply channel 124 delivers fluid against the first circumferential groove 80 on the shaft side 52. The fluid is blocked from moving radially further than the seal plateau 88.

Sufficient fluid can be delivered to result in piston 50 movement, or just enough fluid can be located adjacent the piston 50 to prefill the first circumferential groove 80 and make it ready for movement. By prefilling the first circumferential groove 80, the clutch 112 can react faster and smoother and air in the system can be eliminated.

Fluid is blocked from moving past the seal plateau 88 in the prefill condition, or the clutch engagement condition, via the seal plateau 88 and its seal 92. It can be appreciated that in either condition, centrifugal forces cannot act on fluid that is not there. More particularly, the forces cannot act on fluid that is not located past the seal plateau 88. This has the advantage of not reacting the fluid against the piston 50 via the forces so that the piston 50 remains in the clutch disengaged position.

The fluid forces the piston 50 to move in the axial direction away from the shaft 64 and into the clutch pack 112. The piston 50 compresses the clutch pack 112 causing the interleaved plates 114, 116 to frictionally engage one another and eventually selectively lock together. When the plates 114, 116 are locked together, the housing 118 and the gear 120 rotate together.

If it is desired that the clutch 112 no longer be engaged, fluid pressure to the piston 50 is decreased, or stopped. At a predetermined point, the biasing action of the spring 122 overcomes the fluid pressure and the plates 114, 116 in the clutch pack 112 become disengaged with one another.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A piston, comprising:
    a shaft side radial face comprising:
        a first circumferential groove in the shaft side radial face,
        a seal plateau circumferentially surrounding said first circumferential groove and the seal plateau comprising radial face extending in a circumference around the shaft side radial face of the piston, said seal plateau extending axially outward from said first circumferential groove,
        a second circumferential groove positioned radially outside of the first circumferential groove and said seal plateau;
    a clutch side having two grooves alternating with two lands;
    an inner circumferential surface of the piston having a seal groove formed therein; and
    an outer circumferential surface of the piston having a seal groove formed therein.

2. The piston of claim 1, wherein said piston is one piece, integrally formed and unitary.

3. The piston of claim 1, wherein said outer circumferential surface has a first portion and a second portion, said first and second portions having different diameters, said first portion having the seal groove of the outer circumferential surface formed therein.

4. The piston of claim 1, further comprising an oil port located in the second circumferential groove and extending continuously from the shaft side radial face to the clutch side.

5. The piston of claim 1, wherein said seal plateau has a continuous circumferential groove formed in the continuous radial face of the seal plateau.

6. The piston of claim 1, wherein said first circumferential groove transitions to said seal plateau using a radius.

7. The piston of claim 1, wherein said seal plateau transitions from said second circumferential groove using a radius.

8. The piston of claim 1, wherein the seal plateau prevents fluid transfer between the first circumferential groove and second circumferential groove of the shaft side radial face.

9. A piston clutch system, comprising:
    a piston, comprising:
        a shaft side radial face with a first circumferential groove,
        a seal plateau surrounding said first circumferential groove, the seal plateau formed as a continuous radial face extending in a circumference around the shaft side radial face of the piston, and said seal plateau extending axially outward from said first circumferential groove,
        a second circumferential groove located radially outboard from said seal plateau and first circumferential groove; and
        a clutch side axially opposite said shaft side radial face;
    a shaft extending through an inner circumferential surface of said piston; and
    a clutch pack in direct contact with a piston side of said piston.

10. The piston clutch system of claim 9, wherein said clutch side has two grooves alternating with three lands.

11. The piston clutch system of claim 10, wherein a return spring is located in contact with one of said three lands, and two of said three lands are in contact with said clutch pack.

12. The piston clutch system of claim 9, wherein a fluid conduit in said shaft opens into said first circumferential groove.

13. The piston clutch system of claim 10, wherein a seal groove is formed within the continuous radial face of the seal plateau.

14. The piston clutch system of claim 10, wherein the seal plateau is the only portion of the shaft side radial face of the piston to contact a housing containing the piston.

15. The piston clutch system of claim 10, wherein a supply channel delivers fluid to the first circumferential groove and the seal plateau prevents the delivered fluid from flowing into the second circumferential groove.

* * * * *